United States Patent [19]

Jost

[11] Patent Number: 5,119,893

[45] Date of Patent: Jun. 9, 1992

[54] METHOD FOR CORRECTING AND TARING AN OUTPUT OF A DOSING BELT WEIGHER

[75] Inventor: Gerhard Jost, Muehltal, Fed. Rep. of Germany

[73] Assignee: Carl Schenck AG, Darmstadt, Fed. Rep. of Germany

[21] Appl. No.: 593,104

[22] Filed: Oct. 5, 1990

[30] Foreign Application Priority Data

Oct. 6, 1989 [DE] Fed. Rep. of Germany ....... 3933424

[51] Int. Cl.$^5$ .................... G01G 11/14; G01G 19/40; G01G 23/14
[52] U.S. Cl. .................................. 177/16; 177/25.14; 177/165
[58] Field of Search ................... 177/16, 165, 25.14

[56] References Cited

U.S. PATENT DOCUMENTS 4,071,102 1/1978 Van Ostenbridge et al. ....... 177/165
4,194,649 3/1980 Bullivant et al. ................. 177/165 X

FOREIGN PATENT DOCUMENTS 0056515 7/1982 European Pat. Off. .
2355905 10/1974 Fed. Rep. of Germany .
2734562 2/1979 Fed. Rep. of Germany .
3910028 10/1989 Fed. Rep. of Germany .

Primary Examiner—George H. Miller, Jr.
Attorney, Agent, or Firm—W. G. Fasse

[57] ABSTRACT

A method for taring a dosing belt weigher uses a weight signal produced by a load cell and a belt revolution signal produced by a sensor for providing a taring or weight correction signal that is processed in a taring unit. The taring unit ascertains the weight or load signal individually for each belt section and for a statistically relevant number of belt revolutions. Individual mean values are formed for the individual belt sections and these individual mean values are compared with the total mean value of the ascertained gross weight signals. The resulting difference values are used as taring signals for correcting the individual belt influences which are correlated locally to each individual belt section during the following belt revolution. Thus, each belt revolution is corrected with due regard to the values gathered in a substantial number of preceding belt revolutions.

5 Claims, 3 Drawing Sheets

METHOD FOR CORRECTING AND TARING AN OUTPUT OF A DOSING BELT WEIGHER

FIELD OF THE INVENTION

The invention relates to a method for correcting and taring an output of a dosing belt weigher to provide for a continuously accurate dosing output.

BACKGROUND INFORMATION

Dosing belt weighers are equipped with a load cell for producing a total belt load signal. Such weighers are also equipped with a sensor device for producing a belt r.p.m. signals. Both signals are supplied to a taring device forming part of a closed loop control circuit. The taring device corrects the total belt load signal in accordance with correction values that represent localized belt influencing data or information allocated to a particular belt section.

Dosing belt weighers are special conveyor belts equipped with means for dosing bulk material to be supplied in precisely adjustable conveyed quantities to a processing operation, for example, a chemical process. For ascertaining the conveyed quantity, the load applied to the conveyor belt and the speed of the conveyor belt are measured to provide respective signals. The product of the net belt loading and the belt speed corresponds to the conveyed quantity which must be dosed and which thus requires to be precisely controlled by means of a closed loop circuit. The total belt load is measured to provide a gross or total belt load signal which comprises several signal components. A first signal component of the total belt load signal represents the load caused by the weight of the bulk material. A second signal component represents the weight of the belt itself. A third signal component represents the forces due to belt-stiffness causing a belt influence. By taking into account a complete belt revolution it is possible to obtain a mean belt influence value and to use this mean belt influence value for correcting the total belt load signal. As a result of such correction, one obtains a net value of the weight load which corresponds to the weight of the bulk material being transported on the belt during each belt revolution.

For several modern production methods, especially in the chemical industry, it is required that the supply of dosed quantities of bulk material is precisely constant. In other words, the conveyed quantity of bulk material dropping off the discharge edge of the conveyor belt, must be constant. However, such a precise constancy is not achievable by a correction that relates to full belt revolutions because the belt influence caused by influences other than the bulk material weight, is only constant on average while being subject to substantial fluctuations during one full belt revolution. In order to take the belt influence into account when making the tare correction, it is known to ascertain the components which contribute to the belt influence when no bulk material is being conveyed by the conveyor belt and to allocate the results to individual belt sections while these results are being stored in a memory. During the subsequent weighing operation, the stored correction results are retrieved from the memory in the proper sequence for a correct allocation to the respective belt section, whereby these correction values are subtracted from the measured or actual total belt load signals so that one obtains for each belt section a net belt load signal. In other words, the net belt load signal is obtained for each belt section by deducting the local belt influence signal from the total belt load signal. However, this known method does not lead to the desired dosing precision because the characteristic of the belt influencing function is ambiguous since it depends substantially on several variables, such as the type of operation of the dosing belt weigher, the duration of the belt run, and the belt temperature. Thus, the belt influence depends on slowly time variable influences which cannot be ascertained and compensated by the known method.

OBJECTS OF THE INVENTION

In view of the foregoing it is the aim of the invention to achieve the following objects singly or in combination:

to provide a method for correcting the output of a dosing belt weigher of the type described above in such a manner that during the continuous weighing operation, the time a variable belt influence that adversely affects the accuracy of the weighing result and thus the belt output is compensated by making the respective correction;

to provide a method for operating a dosing belt weigher which will provide a constant output of the conveyed quantity of bulk material; and to ascertain slowly changing influences that adversely affect the accuracy of the weighing result and use these influences in correcting the weighing result so that a high dosing accuracy is assured for each individual belt section to provide a constant belt output.

SUMMARY OF THE INVENTION

According to the invention there is provided a method for correcting and an output of a dosing belt weigher, comprising the following steps: forming a first mean value of a plurality of total belt load signals measured on the basis of a statistically relevant number of belt revolutions; forming second mean values for each belt section from total belt load signals which constitute the sum total of individual belt load signals allocated to respective belt sections; comparing the first mean value with the second mean values to form difference value signals; and forming taring signals from said difference value signals for correcting the effect of a localized belt influence during the next following belt revolution.

The method according to the invention is based on the fact that the weight load caused by the bulk material on the conveyor belt and the belt influence caused by other influences are substantially different from one another in their statistical behavior. The belt influence caused by other influences is dependent on localized belt conditions that may differ along a belt length and due to the physical nature of the belt stiffness. These belt conditions and influences are subject to variations that change slowly over time. Accordingly, the belt influence caused by influences other than the bulk material weight is a quasi-stationary signal. The variations of the weight load on the other hand caused by the weight of the bulk material, have a pure random or stochastic character and can therefore be considered to have a constant mean value for several belt revolutions viewed individually in each belt section. Thus, it is possible according to the method of the invention to filter out of the total belt load signal, the localized belt influence and to use the filtered out components for the taring of the belt load individually for each belt section. Fluctuations of the belt influence that change slowly with time, are thus ascertained and taken into account for the taring, whereby the method according to the invention makes it possible to achieve a high dosing accuracy individually for each belt section, and this accuracy is no longer subject to changes in the belt influence.

According to a further embodiment of the invention the tare signals allocated to the individual belt sections are formed by subtracting from the total belt load signals ascertained individually for each belt section during one belt revolution, the mean value of the sum of the total belt load signals, thereby forming difference values for a statistically relevant number of belt revolutions, whereby the tare signals are then formed from these mean values. Such a signal processing makes it possible to use a taring computer of simple construction.

According to the invention there is further provided that the total belt load signals which are being processed by the taring computer are reduced by values representing an average belt influence effective when the belt travels without any bulk material thereon. Thus, the belt weigher is tared empty when the dosing belt weigher operates without any bulk material on the conveyor belt. The resulting "empty" signal value is then deducted from the signal value obtained when bulk material is on the conveyor belt. Due to the "empty" taring, the average of the total belt load signals corresponds already to the average net belt load because the empty taring signal is deducted from the full or gross load signal.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
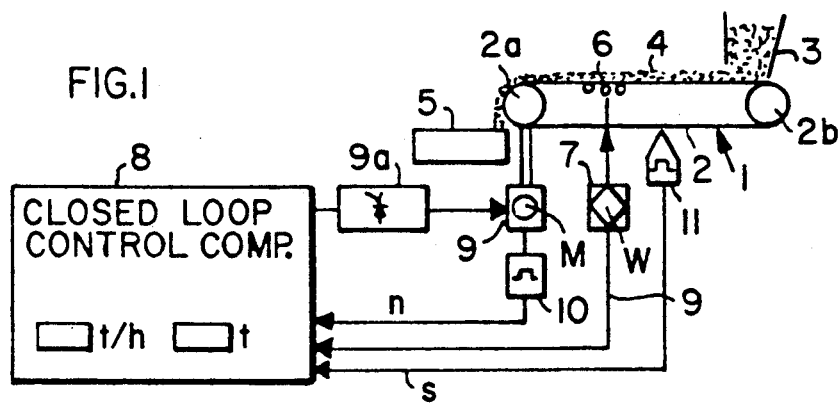
FIG. 1 is a block circuit diagram of a dosing belt weigher with its taring computer in a closed loop control arrangement.

FIG. 1 shows the basic arrangement of a dosing belt weigher 1 with its closed loop control circuit, including a closed loop control computer 8. An endless weighing belt 2 runs around two pulleys 2a and 2b. Pulley 2a is a driving pulley driven by a closed loop control motor 9. Pulley 2b is a guide pulley. A supply hopper 3 feeds bulk material 4 onto the upper run of the conveyor belt 2. The left-hand discharge end of the conveyor belt 2 delivers the accurately weighed bulk material into a processing container 5. The belt 2, or rather its upper run, also moves over at least one weighing idlers 6, the load of which, including that of the belt, is measured by a load cell 7. The load cell 7 produces a total load signal q supplied on a respective conductor to the closed loop control computer 8. The pulley 2a is itself driven by a motor 9 connected with a control input through a control circuit 9a to the closed loop control computer 8.

The r.p.m. of the motor 9 is sensed by a sensor 10 providing a signal n to the computer 8. This signal n represents the beltspeed and is used to determined the belt sections. A further sensor 11, positioned to sense the belt movement of the belt 2, supplies a synchronizing signal s to a respective input of the computer 8.

The closed loop control computer 8 calculates from the total or growth load signal q and from the belt revolution representing signals n, the actual conveyed quantity of the bulk material. Such calculation is performed continuously and involves a comparing with an adjustable rated conveyed quantity. Such rated conveyed quantity may be stored in a memory of the computer 8 and may be adjusted as required. As a result of the comparing of the actual conveyed quantity with the rated conveyed quantity, the closed loop control computer 8 provides a control signal through the control circuit 9a to the control input of the motor 9 for controlling the belt speed in such a manner that the quantity of bulk material delivered into the container 5 corresponds to the adjusted rated conveyed quantity.

Figure 2:
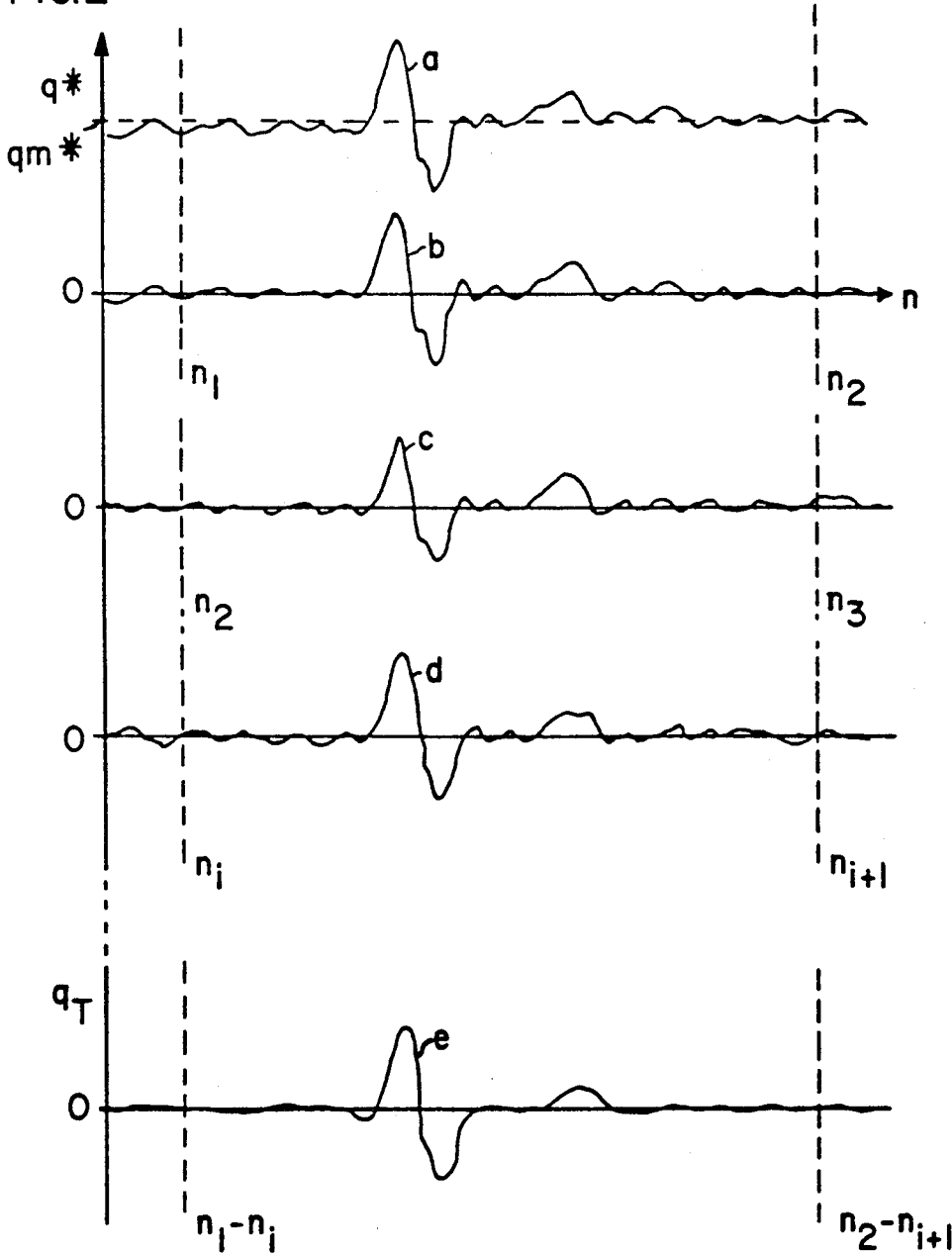
FIG. 2 shows the total belt load signals for a plurality of belt revolutions representing a continuous weighing operation and the taring signal derived from the continuous weighing operation.
Figure 3:
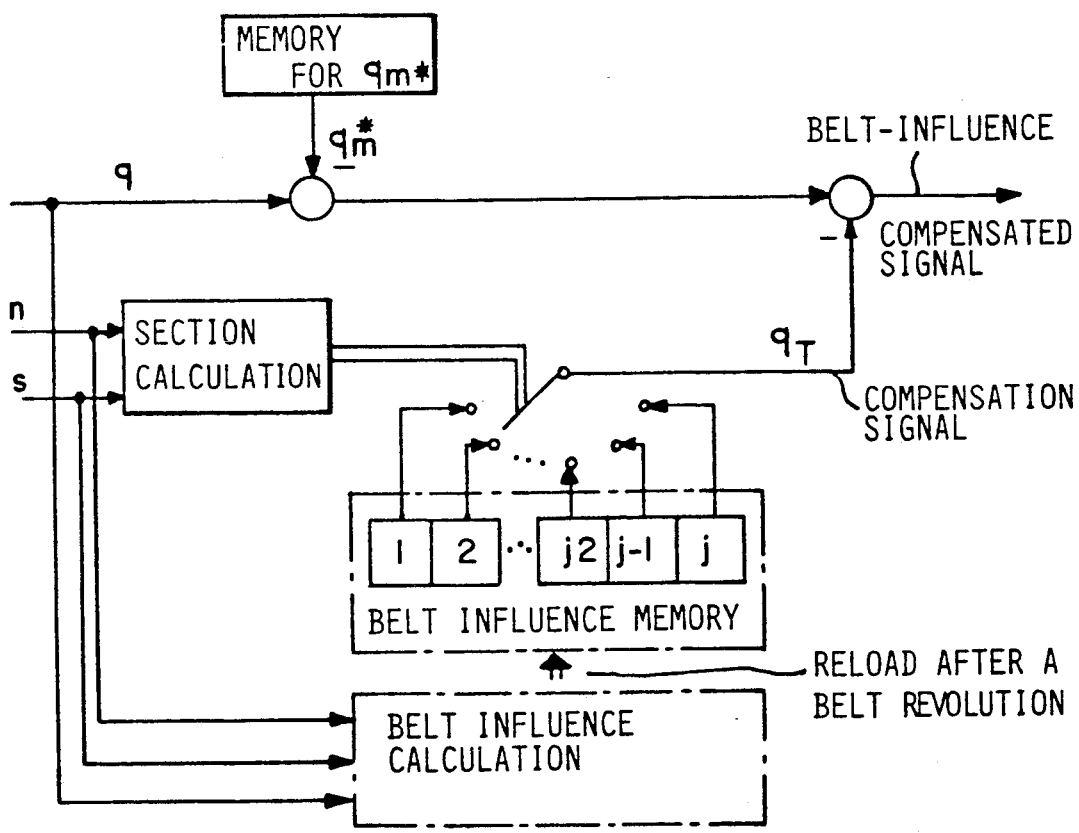
FIG. 3 shows a more detailed block diagram of the taring computer.
Figure 4:
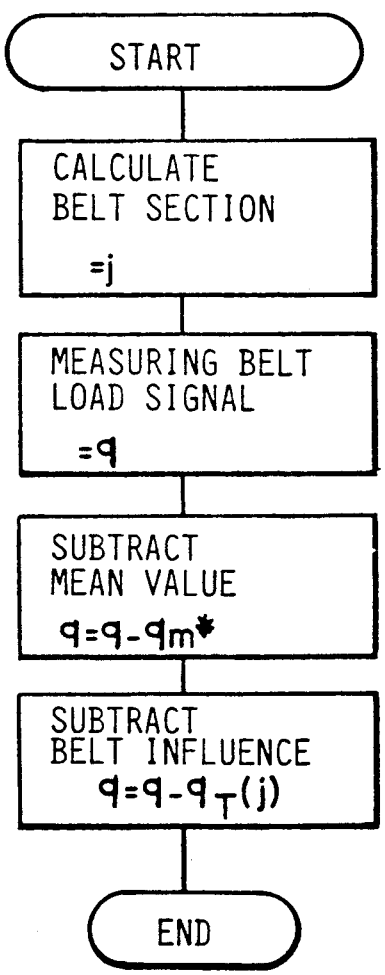
FIG. 4 shows a flow diagram of the operations performed by the taring computer for the continuous correction of the taring.

In order to ascertain the actual conveyed quantity from the total or gross load signal q obtained by the load cell 7, it is necessary that the closed loop control computer 8 is equipped with a taring computing section which ascertains the stress load component contained in the gross load signal for respectively correcting the gross load signal q to obtain a net load signal q'. For performing this correction, the mean value of the belt influences for a full belt revolution are ascertained while the belt runs empty without any bulk material thereon. The so ascertained correcting value for the influence belt or its respective signal is stored in a memory of the computer 8. This initial mean value is then deducted from the subsequently obtained total or gross load signals q which are ascertained individually for each belt section, for example, for each 1 m length belt section. As a result of this signal processing, pretared weighing signals q* are formed which contain the local belt loading by the bulk material on the particular belt section and the local deviations of the belt stress influencing values. These pretared signals q* are stored in a memory of the computer 8 in accordance with a belt section sequence obtained with the aid of the belt revolution signal n that has been obtained with the aid of the sensors 10 and 11. This correlation of the pretared weighing signals q* to their respective belt section and their respective storing is such that the corresponding characteristic curve "a" can be illustrated as shown in FIG. 2 over one belt revolution $n_1$ to $n_2$. The pretared weighing signals q* for each belt section summed over one belt revolution and a mean value qm* is formed. This mean value is subtracted from the original signal. The just described operation is repeated a number of times which becomes statistically relevant. For example, such mean values qm* are formed for a total i revolutions of the belt, expressed as $n_1$ to $n_i$. The curves b, c, and d in FIG. 2 represent a typical characteristic or curve for the stored signal values of belt revolutions following each other. When the statistically relevant number $n_i$ of revolutions has been reached, the mean values are formed from the summed signals of the individual belt sections, whereby the curve e shown in FIG. 2 is obtained. Curve e shows that the stochastic variations or fluctuations of the belt stress components of the pretared weighing signal q* have been reduced to zero by the described signal processing. On the other hand, the quasi-stationary belt load component or influence has retained its typical characteristic curve as shown at e. Thus, the curve e contains only the fluctuations of the belt influencing values which are independent of the load of the bulk material of the belt so that the curve e or its values can be used as a taring signal $q_T$ for the correction of the pretared weighing signal $q^*$ in a section-by-section manner for the next following belt revolution to obtain a net load signal $q'$.

The described ascertaining and processing of the pretared weighing signals $q^*$ is performed, as mentioned, in the closed loop control computer 8, or rather in the taring section thereof for a predetermined, statistically relevant number of belt revolutions which precede the belt revolution for which presently a taring operation is performed. Thus, according to the invention the ascertaining of signals for performing the taring is limited always to a defined section of the weighing operation preceding directly the presently performed taring operation so that slow time fluctuations or influences on the belt are ascertained and taken into account for the taring operation. The described correcting method thus makes it possible to assure an optimal, automatic correction of the belt influence even for continuously proceeding weighing operations taking place for prolonged periods of time.

Although the invention has been described with reference to specific example embodiments, it will be appreciated that it is intended to cover all modifications and equivalents within the scope of the appended claims.

What I claim is:

1. A method for correcting an output of a belt weigher for dosing bulk material, comprising the following steps:
   (a) repetitively measuring or sensing a gross belt load to provide respective gross belt load signals based on a statistically relevant number of belt revolutions when bulk material is transported on a belt of said belt weigher,
   (b) forming from said gross belt load signals a first arithmetic means or average value,
   (c) measuring or sensing belt load portions individually for a plurality of individual belt sections to form belt section load signals,
   (d) forming from said belt section load signals second arithmetic mean or average values allocated individually to each belt section,
   (e) comparing said first arithmetic mean value with said second arithmetic means values to provide difference values,
   (f) producing from said difference values correcting signals individually for each belt section, and
   (g) using said correcting signals for correcting an output of said belt weigher individually for each respective belt section, whereby a constant output of bulk material is obtained.

2. The method of claim 1, further comprising forming an arithmetic tare mean value of influences effective on said belt when said belt runs empty without any bulk material on said belt, and deducting from said gross belt load signals said arithmetic tare mean value.

3. The method of claim 1, wherein said second arithmetic mean values are formed by the following steps:
   (h) forming a third arithmetic mean value from weighing signals measured for one belt revolution,
   (i) deducting said third arithmetic mean value from weighing signals of said one belt revolution to provide difference signal values,
   (j) repeating said steps (h) and (i) for a statistically relevant number of belt revolutions to provide said difference signal values in a statistically relevant manner,
   (k) forming fourth arithmetic mean values from said difference signal values, and
   (l) using said fourth arithmetic mean values as taring signals individually for each belt section.

4. The method of claim 3, further comprising forming an arithmetic tare mean value of influences effective on said belt when said belt runs empty without any bulk material on said belt, and deducting from said gross belt load signals said arithmetic tare mean value.

5. A method for taring an output of a belt weigher for dosing bulk material to achieve a constant net output, comprising the following steps:
   (a) forming an arithmetic tare mean value of influences effective on said belt when said belt runs empty without any bulk material on said belt,
   (b) repetitively measuring or sensing a gross belt load to provide respective gross belt load signals based on a statistically relevant number of belt revolutions when bulk material is transported on a belt of said belt weigher,
   (c) forming from said gross belt load signals a first arithmetic mean or average value,
   (d) measuring or sensing belt load portions individually for a plurality of individual belt sections to form belt section load signals,
   (e) forming from said belt section load signals second arithmetic mean or average values allocated individually to each belt section,
   (f) comparing said first arithmetic mean value with said second arithmetic mean values to provide different values,
   (g) producing from said difference values correcting signals individually for each belt section,
   (h) using said correcting signals for correcting an output of said belt weigher individually for each respective belt section, and
   (i) deducting from said gross belt load signals said arithmetic tare mean value, whereby a constant net output of bulk material is obtained.

* * * * *

UNITED STATES PATENT AND TRADEMARK OFFICE
CERTIFICATE OF CORRECTION

PATENT NO.  : 5,119,893
DATED       : June 9, 1992
INVENTOR(S) : Gerhard Jost

It is certified that error appears in the above-identified patent and that said Letters Patent is hereby corrected as shown below:

Claim 1, column 5, line 41, replace "means" by --mean--;
         column 5, line 49, replace "means" by --mean--;
Claim 5, column 6, line 47, replace "different" by
                            --difference--.

Signed and Sealed this

Tenth Day of August, 1993

Attest:

MICHAEL K. KIRK

*Attesting Officer*      *Acting Commissioner of Patents and Trademarks*